US008178204B2

(12) United States Patent
Shaffer et al.

(10) Patent No.: US 8,178,204 B2
(45) Date of Patent: May 15, 2012

(54) ACRYLATE-MODIFIED ASPARTATES AND GEL COAT COMPOSITIONS MADE THEREFROM

(75) Inventors: Myron W. Shaffer, New Cumberland, WV (US); John P. Forsythe, Allison Park, PA (US); Leone Hermans-Blackburn, Coraopolis, PA (US); Amy S. Wylie, Aliquippa, PA (US); Aaron A. Lockhart, Pittsburgh, PA (US); Emery Yuhas, Hickory, PA (US); Roy B. Clemens, Moon Township, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1015 days.

(21) Appl. No.: 12/156,542

(22) Filed: Jun. 2, 2008

(65) Prior Publication Data

US 2009/0226645 A1 Sep. 10, 2009

Related U.S. Application Data

(63) Continuation-in-part of application No. 12/074,670, filed on Mar. 5, 2008, now abandoned.

(51) Int. Cl.

| | |
|---|---|
| ***B32B 27/40*** | (2006.01) |
| ***B05D 5/00*** | (2006.01) |
| ***C08G 18/08*** | (2006.01) |
| ***C08L 75/04*** | (2006.01) |

(52) U.S. Cl. ............... 428/423.1; 427/255.6; 428/423.7; 428/425.1; 428/425.8; 524/265; 524/589

(58) Field of Classification Search ............... 428/423.1, 428/423.7, 425.1, 425.8; 427/255.6; 524/265, 524/589
See application file for complete search history.

(56) References Cited

U.S. PATENT DOCUMENTS

| | | | |
|---|---|---|---|
| 6,590,066 B1 | 7/2003 | Roesler | |
| 6,617,032 B2 | 9/2003 | Rickner et al. | |
| 6,870,000 B2 | 3/2005 | Gupta | |
| 7,001,948 B2 | 2/2006 | Gupta et al. | |
| 7,148,287 B2 | 12/2006 | Gupta | |
| 2003/0004265 A1 | 1/2003 | Gupta et al. | |
| 2004/0092697 A1 | 5/2004 | Kia et al. | |
| 2005/0124714 A1 | 6/2005 | Weikard et al. | |
| 2006/0046068 A1 | 3/2006 | Barancyk et al. | |
| 2006/0287463 A1 | 12/2006 | Wehner | |
| 2007/0160851 A1 | 7/2007 | Barancyk et al. | |
| 2007/0172645 A1 | 7/2007 | Ogonowski et al. | |
| 2007/0237965 A1 | 10/2007 | Rosthauser | |
| 2009/0226644 A1 * | 9/2009 | Wylie et al. | 428/15 |

FOREIGN PATENT DOCUMENTS

| | | |
|---|---|---|
| DE | 19729262 A1 | 1/1999 |
| WO | 2008076707 A2 | 6/2008 |
| WO | 2008076714 A1 | 6/2008 |

* cited by examiner

*Primary Examiner* — Timothy J. Kugel
(74) *Attorney, Agent, or Firm* — Robert S. Klemz; Noland J. Cheung

(57) ABSTRACT

A coating composition is provided. The composition comprises as component I, a) a polyaspartic acid ester comprising the reaction product of one more diamines, one or more difunctional acrylate-containing compounds and one or more maleic/fumaric acid esters; b) at least one moisture scavenger; c) at least one deaerator; d) at least one plasticizer; and e) optionally additives; and as component II, one or more polyisocyanates. Methods of making and applying the composition to a substrate are also provided. The coating is particularly suitable for use as a gel coat.

23 Claims, No Drawings

ACRYLATE-MODIFIED ASPARTATES AND GEL COAT COMPOSITIONS MADE THEREFROM

CROSS-REFERENCE TO RELATED APPLICATIONS

This application is a continuation-in-part application of U.S. patent application Ser. No. 12/074,670, filed Mar. 5, 2008 now abandoned.

FIELD OF THE INVENTION

This invention relates to coating compositions prepared from acrylate-modified aspartates and polyisocyanates. The coatings are particularly suitable as gel coats on fiber-reinforced composites.

BACKGROUND INFORMATION

Glass fiber reinforced plastics (FRP) include glass fiber marine craft, showers and bathtubs, building and automotive panels, swimming pools, satellite dishes, and the like.

Conventional FRP construction methods include the construction of a mold, the application of a releasing agent such as a wax to the mold, the application of a gel coat to the waxed mold, and the application of a glass fiber reinforced laminate to the gel coat. The unsaturated polyester resin contained in the gel coat and the ensuing laminating resin which binds the-glass fiber reinforcement is a styrene or styrene/methyl methacrylate, free radical initiated, liquid thermosetting resin which upon catalysis with an organic peroxide such as methyl ethyl ketone peroxide, gels and cures to a solid thermosetting state.

When the FRP is removed from the mold, the glass fiber reinforced laminate is covered by the decorative layer of gel coat.

Unfortunately, prolonged exposure to ultraviolet radiation affects the gel coat in several detrimental ways. For example, a gel coat exposed to sunlight and other elements will lose its gloss in a relatively short period of time. In the FRP industry this loss of gloss is known as chalking.

The known shortcomings of gel coat have led inventors to find improvements that will protect the coating from the elements. There is a continued need for gel coats that provide the desired combination of properties.

SUMMARY OF THE INVENTION

Accordingly, the present invention provides a coating composition comprising as component I, a) a polyaspartic acid ester comprising the reaction product of one more diamines, one or more difunctional acrylate-containing compounds and one or more maleic/fumaric acid esters;

b) at least one moisture scavenger;

c) at least one deaerator;

d) at least one plasticizer;

e) optionally, further additives; and as component II, one or more polyisocyanates.

The present invention also provides a polyaspartic acid ester comprising the reaction product of one more diamines, one or more difunctional acrylate-containing compounds and one or more maleic/fumaric acid esters.

Methods of preparing the coating composition methods of coating a substrate, and coated substrates are also provided.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The polyaspartic acid ester comprises the reaction product of one or more diamines, one or more difunctional acrylate-containing compounds and one or more maleic/fumaric acid esters. The diamine, acrylate and ester are reacted together in an equivalent ratio of amine to amine-reactive components of 0.8/1.0 to 1.2/1.0, preferably 0.95/1.0 to 1.05/1.0, most preferably 1.0/1.0. When the most preferred ratio of amine to amine/reactive components is used, the diamine, acrylate and ester are reacted together in a ratio of from 1 equivalent amine: 0.1 equivalents acrylate: 0.9 equivalents maleate, to 1 equivalent amine: 0.02 equivalents acrylate: 0.98 equivalents maleate. More preferably, the diamine, acrylate and ester are reacted together in a ratio of from 1 equivalent amine: 0.1 equivalents acrylate: 0.95 equivalents maleate, to 1 equivalent amine: 0.04 equivalents acrylate: 0.98 equivalents maleate.

In the acrylate/acid ester mixture, about 1-2 wt. % will be acrylate, the remainder being acid ester, more preferably 1.5-2 wt. % acrylate, remainder acid ester.

Suitable diamines include, without limitation, ethylenediamine, 1,2-diaminopropane, 1,4-diaminobutane, 1,3-diaminobenzene, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11 -diaminoundecane, 1,12-diaminododecane, 1,3- and/or 1,4-cyclohexane diamine, 1 -amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

Other suitable diamines include, for example, 1,3,3-trimethyl-1-aminomethyl-5-aminocyclohexane (IPDA), 1,8-p-diaminomenthane, bis(4-aminocyclohexyl)methane, bis(4-amino-3-methylcyclohexyl)-methane, bis(4-amino-3,5-dimethylcyclohexyl)methane, bis(4-amino-2,3,5-trimethylcyclohexyl)methane, 1,1 -bis(4-aminocyclohexyl) propane, 2,2-(bis(4-aminocyclohexyl)propane, 1,1-bis(4-aminocyclohexyl) ethane, 1,1-bis(4-aminocyclohexyl) butane, 2,2-bis(4-aminocyclohexyl)butane, 1,1-bis(4-amino-3-methylcyclohexyl) ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclo-hexyl)butane, 2,4-diamino-dicyclohexylmethane, 4-aminocyclohexyl-4-amino-3-methyl-cyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

Also suitable are aromatic diamines such as for example, 1,4-diaminobenzene, 1,3-bis(aminomethyl)benzene (MXDA), 2,4- and/or 2,6-diaminotoluene, 2,4'- and/or 4,4'-iaminodiphenylmethane, 3,3'-dimethyl-4,4'-diaminodiphenylmethane, 3,3'-dichloro-4,4'-diaminodiphenylmethane (MOCA), 1-methyl-3,5-bis(methylthio)-2,4- and/or 2,6-diaminobenzene, 1-methyl-3,5-diethyl-2,4-diaminobenzene and/or 1-methyl-3,5-diethyl-2,6-diaminobenzene (i.e. DETDA), 1,3,5-trimethyl-2,4-diaminobenzene, 1,3,5-triethyl-2,4-diaminobenzene, 1,3,5-triisopropyl-2,4-diaminobenzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene, 3,5-dithiomethyl-2,4-diamino toluene (i.e. ETHACURE 300); 4,6-dimethyl-2-ethyl-1,3-diaminobenzene; 3,5,3',5'-tetraethyl-4,4-diaminodiphenyl-methane; 3,5,3',5'-tetraisopropyl-4,4'-diaminodiphenylmethane; 3,5-diethyl-3',5'-diisopropyl-4,4'-diaminodiphenylmethane; 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylene-diamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylene-diamine; 4,6-di-sec-butyl-m-phenylenediamine; 4-ethyl-6-tert-butyl-m-phenylenediamine; 4-ethyl-6-sec-butyl-m-phenylenediamine; 4-ethyl-6-isobutyl-m-phenylene-diamine; 4-isopropyl-6-isobutyl-m-phenylene-diamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine. Any of the above diamines may, of course, also be used as mixtures.

Preferred are 1,4-diaminobutane, 2-methyl-1,5-pentane diamine, 1,6-diaminohexane, 2,2,4- and/or 2,4,4-trimethyl-1,6-diaminohexane, 1-amino-3,3,5-trimethyl-5-aminomethyl-cyclohexane, 4,4'-diamino-dicyclohexylmethane or 3,3'-dimethyl-4,4'-diamino-dicyclohexyl-methane. Most preferred is 4,4'-diamino-dicyclohexyl methane. Maleic or fumaric acid esters are compounds of the formula

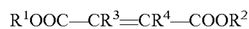

$$R^1OOC—CR^3═CR^4—COOR^2$$

where $R^1$, $R^2$, $R^3$ and $R^4$ are groups that are "inert to isocyanate groups under the reaction conditions," which means that these groups do not have Zerevitinov-active hydrogens (CH-acid compounds; cf. Römpp Chemie Lexikon, Georg Thieme Verlag Stuttgart), such as OH, NH or SH, $R^1$ and $R^2$, independently of one another, are preferably $C_1$ to $C_{10}$ alkyl residues, more preferably methyl or ethyl residues. $R^3$ and $R^4$ are preferably hydrogen. Examples of suitable maleic or fumaric acid esters are dimethyl maleate, diethyl maleate, dibutyl maleate and the corresponding fumarates.

Suitable difunctional acrylate-containing compounds include, for example, ethylene glycol diacrylate, propane 1,3-diol diacrylate, butane 1,4-diol diacrylate, hexane 1,6-diol diacrylate, and the corresponding methacrylates. Also suitable are di(meth)acrylates of polyether glycols of initiated with ethylene glycol, propane 1,3-diol, butane 1,4-diol.

The polyaspartic acid ester is prepared by reacting, in a first step, a diamine with a difunctional acrylate-containing compound to form a first reaction product. In a second step the first reaction product is reacted with a maleic/fumaric acid ester. Both first and second steps are preferably carried out in the absence of any catalyst. The reaction is carried out at atmospheric pressure, under a nitrogen blanket, a temperature of about 50°-55° C., with exotherm controlled by the rate of addition, so that the temperature is kept in this range. Typically, preparation is carried out over a period of 12-24 hours, under monitoring, and the reaction stopped when the desired unsaturation level is obtained.

Coating compositions of the present invention further comprise at least one moisture scavenger or drying agent. As used herein, the term "moisture scavenger" refers to compounds that eliminate free moisture (water). Moisture scavengers are well known in the art. Suitable moisture scavengers include, for example, ethylenically unsaturated alkoxysilanes, such as vinyl trimethoxysilane, vinyl triethoxysilane, and the like. A preferred moisture scavenger is vinyl trimethoxy silane sold under the trade name Silquest A-171®, available from Crompton Corp. of Middlebury, Conn. Mixtures of moisture scavengers can also be used.

Coating compositions of the invention further include at least one deaerator or defoamer. As used herein, the term "deaerator" refers to compounds that are suitable for removing dissolved gases and breaking up bubbles and foam that may arise during mixing, and which are undesirable in the final coating. Defoamers/deaerators are well known in the art. In the context of the present invention, preferred deaerators include silicone-based compounds, emulsions, and mixtures, such as polysiloxanes, polysiloxanes mixed with hydrophobic solids, siloxated polyethers mixed with hydrophobic particles, and emulsions of siloxated polyethers. Particularly preferred is a polysiloxane sold under the trade name TEGO® Airex 980, available from Tego Chemie Service GmbH of Germany. Also suitable are BYKT-25 and BYK-28, silicone defoamers sold by BYK-Chemie GmbH of Germany.

The coating compositions of the invention further include at least one plasticizer. The term "plasticizer" is given the meaning ordinarily used in the art, an organic compound added to a polymer to facilitate processing and to increase the flexibility and toughness of the final product by internal modification of the polymer molecule. Numerous types of plasticizers are known in the art, and use will depend on the desired properties in the final product. In the context of the present invention, preferred plasticizers are aromatic sulfonic acid esters. Particularly preferred is an arylsulfonic acid ester of phenol sold under the trade name Mesamoll® by Bayer Material Science LLC of Pittsburgh, Pa.

The coating compositions of the present invention further comprise one or more polyisocyanates. Non-limiting examples of suitable polyisocyanates include monomeric aliphatic, cycloaliphatic, araliphatic and/or aromatic diisocyanates. Examples of diisocyanates include 1,6-diisocyanatohexane, 1-isocyanato-3,3,5-tri-methyl-5-isocyanatomethylcyclohexane (isophorone diisocyanate), 4,4-diisocyanatodicyclohexylmethane, 1,4-diisocyanatocyclohexane, 1-methyl-2,4-diisocyanatocyclohexane, 1-methyl-2,6-diisocyanatocyclohexane and mixtures thereof. 4-isocyanatomethyl-1,8-octane diisocyanate will be used without further modification.

The polyisocyanates of the aforementioned kind preferably have an NCO group content of 5 to 25% by weight, an average NCO functionality of 2.0 to 5.0, preferably 2.8 to 4.0, and a residual amount of monomeric diisocyanates, used for their preparation, of below 1% by weight, preferably below 0.5% by weight.

Polyisocyanates containing urethane groups can be used, for example, the reaction products of 2,4- and optionally 2,6-diisocyanatotoluene or 1-methyl-2,4- and optionally 1-methyl-2,6-diisocyanatocyclohexane with substoichiometric amounts of trimethylolpropane or its mixtures with simple diols, such as the isomeric propanediols or butanediols. The preparation of polyisocyanates of this kind containing urethane groups, in virtually monomer-free form, is described in, for example, DE-A 109 01 96.

Suitable isocyanates can also include oligomeric polyisocyanates including, but not limited to, dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including, but not limited to, carbodiimides and uretdiones, and mixtures thereof. Examples of preferred polyisocyanates are those containing biuret, isocyanurate and/or iminooxadiazinedione structures. Polyisocyanates containing iminooxadiazinedione groups, and their preparation, can be found in, for example, EP-A 798 299, EP-A 896 009, EP-A 962 454 and EP-A 962 455. Particularly preferred are the aliphatic, aliphatic/cycloaliphatic and/or cycloaliphatic single-type or mixed trimers based on 1,6-diisocyanatohexane and/or isophorone diisocyanate, which are obtainable in accordance, for example, with U.S. Pat. No. 4,324,879, U.S. Pat. No. 4,288,586, DE-A 310 026 2, DE-A 310 026 3, DE-A 303 386 0 or DE-A 314 467 2, some of which are available under the designation DESMODUR® from Bayer MaterialScience of Pittsburgh, Pa. including DESMODUR® N 100, DESMODUR® N 3200, DESMODUR® N 3300, DESMODUR® N 3400, DESMODUR® XP 2410, and DESMODUR® XP 2580.

The coating compositions of the present invention will comprise 35-65 wt. % polyaspartic acid ester, 25-35 wt. % polyisocvanate, 0.5-4.0 wt. % plasticizer, 0.25-3.0 wt. % moisture scavenger and 0.25-3.0 wt. % defoamer, based on the total weight of the composition (components I and II).

The molar ratio of the polyaspartic acid ester to polyisocyanate will range from 1.0:0.8 to 1.0:2.0.

Coating compositions of the present invention can optionally include additional additives, as are known in the art, non-limiting examples of which are thixatropes(thickeners), catalysts, fillers, emulsifiers, surface-active stabilizers, pigments, dyes, UV-stabilizers, hindered-amine light stabilizers, antioxidants, leveling additives, dispersing and grinding aids, impact modifiers, flame-retardants, biocides, and the like.

In use, components I (the polyaspartic acid ester, at least one moisture scavenger, at least one deaerator, at least one plasticizer and optional additives, having been premixed with a Cowels® type mixing blade or similar equipment, and component II, the polyisocyanate, are combined in a manner suitable to facilitate mixing and reaction thereof, and to enable coating of the mixed compositions onto the desired substrate prior to completion of the reaction.

Preferably, these compositions are mixed together using a plural component positive displacement mixing spray system, wherein the spray combines streams of the compositions with complete mixing and simultaneous application of the mixed spray to the intended substrate. The system will include the following components: a proportioning section which meters the components and pressurizes the material; optionally, a heating section to raise the temperatures of the components to adjust the viscosity; and an impingement spray gun which combines the two components and allows mixing just prior to atomization. Alternatively, the spray system will comprise a short static mixing element at the end of the spray nozzle to assist in accomplishing complete mixing. An example of a suitable spray is the low pressure plural component positive displacement equipment made by Langeman Manufacturing Ltd. of Leamington, Ontario, Canada. Alternatively, the coating of the present invention may be prepared by mixing in a static mix device to achieve blending of the compositions. However, at the spray gun, the components are combined and pumped through a length of tubing which contains elements designed to mix the components prior to atomizing. The static system requires periodic flushing of the static mix tube to prevent accumulation of cured polyurea, which could plug the spray gun.

It is preferred to use equipment which can operate at low pressure. As used herein, the term "low pressure" means pressures below 2,500 psi. Preferably the spraying is carried out at pressures between 300-2000 psi, more preferably between 300 and 1500 psi, and most preferably between 300 and 1,000 psi.

Viscosity behavior of the each of the components is particularly important for two part spray coating processes. With low pressure positive displacement mixing, the two parts should be as close as possible in viscosity to allow adequate mixing and even cure. Preferably, the viscosity of the combined composition (components I and II) is between 500-2500 centipoise at room temperature, more preferably 800-1200 centipoise, as measured using a Brookfield LVDVI viscometer. Optionally, the viscosity may be adjusted at the time of mixing by heating one or both sides of the multiple part system prior to spray mixing.

The compositions as described above are mixed together in a suitable manner, and applied to all intended substrate at a thickness of from about 3 to about 100 mills, and more preferably from about 5 to about 50 mils. Preferred ranges of thickness depend on the ultimate article to be manufactured. In some embodiments a lower film thickness will be desired, such as a coating having a thickness of about 5 to about 20 mils, or about 6 to about 8 mils. Multiple passes of the spray system may be used until the desired thickness is achieved.

The compositions as described above are preferably formulated to an applied coating with a tack-free time of 30 seconds to 30 minutes, more preferably 45 seconds to 15 minutes. The coating is versatile enough to be used for fast or slow systems, depending on the aspartate used, and the tack-free time can be adjusted up or down, depending on the needs of the user.

In one aspect of the present invention, the coating of the present invention is applied to a substrate for coating of that substrate as a topcoat. In this embodiment, the present invention provides a convenient laminate providing high strength without the need for conventional lamination techniques incorporating pressure and heat application. Thus, existing articles may be readily coated with a new and aesthetically pleasing coating. Examples of such articles include bathtubs, appliance surfaces, furniture such as tables and chairs, counter tops, boats, and the like.

In another aspect of the present invention, the coating of the present invention may be applied to a mold surface as a gelcoat, and allowed to cure with later removal of the mold to provide the shaped article created thereby. It has been found that the coatings of the present invention provide specific benefit as gelcoats, because the coatings are readily removed from the mold. While not being bound by theory, it is believed that the hardness properties of the coatings contribute to the ability to demold gelcoats of the present invention. Optionally, after allowing the coating as applied to the mold to become tack free, subsequent materials such as structural foams, may be applied thereto to provide a more rigid structure. Alternatively, a framework made from a more rigid material, such as metal, wood, composite, fiber reinforced foam, cardboard or the like, may be fastened to the cured coating by adhesive, structural foam, mechanical fasteners, combinations of the above, and the like. The thus prepared gelcoat product preferably has at least sufficient rigidity to be readily removed from the mold. The ability to utilize a wide variety of materials in combination with the gelcoat of the present invention makes it possible to create aesthetically pleasing articles while achieving a high strength/low weight ratio. The present invention thus provides aesthetically pleasing articles in a low cost manufacturing system.

Preferably, coating compositions of the present invention are sprayed on the substrate while maintaining a volumetric ratio of from 1:10 to 10:1 for the ratio of component I to component II. More preferably, 1:3 to 3:1 volumetric ratio is maintained. In one embodiment, a 2:1 volumetric ratio of component I to component II is maintained.

Additional examples of suitable substrates include, but are not limited to, metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, saturated or unsaturated polyurethane composites, saturated or unsaturated polyester composites, asphalt, fiberglass, soil, or gravel.

EXAMPLES

The following example is intended to illustrate the invention and should not be construed as limiting the invention in any way.

A polyaspartic ester was prepared by the following procedure:

Example 1

1531.73 g of PACM-20 (4-4'diamino dicyclohexyl methane) were charged to a round bottom flask. 73.84 g of HDDA (1,6 Hexanediol diacrylate) were then charged to the round bottom flask and the mixture was heated to 60° C. for 5 hours. 2394.43 g DEM (Diethyl maleate) were charged to the flask at a rate slow enough to keep the temperature under 60° C. The mixture was held at 55° C. for 7 hours.

| Material | Wt. (g) | Eq Wt | Eq |
|---|---|---|---|
| PACM-20 | 1531.73 | 105.2 | 14.5601 |
| 1,6 Hexanediol diacrylate | 73.84 | 112.70 | 0.6552 |
| Diethyl maleate | 2394.43 | 172.20 | 13.9049 |
| Total Wt. | 4000.00 | | |

The resulting polyaspartic ester had an amine number of 205.9 and a viscosity at 25° C. of 1166 cps after one month.

The following materials were used to prepare a coating composition of the invention:

| Raw Material | Weight | Volume | Weight Solids | Volume Solids |
|---|---|---|---|---|
| Component 1 | | | | |
| Polyaspartic Ester prepared according to Example 1 | 8434.06 | 946.58 | 8434.06 | 946.58 |
| Mesamoll | 260.52 | 29.57 | 260.52 | 29.57 |
| Tego Airex 980 | 214.83 | 27.16 | 214.83 | 27.16 |
| Silquest A-171 Silane | 214.83 | 26.52 | 214.83 | 26.52 |
| Kronos 2310 | 3473.21 | 104.18 | 3473.21 | 104.18 |
| Subtotal | 12,597.45 | 1134.01 | 12597.45 | 1134.01 |
| Component 2 | | | | |
| Desmodur XP 2410 | 4873.47 | 507.65 | 4873.47 | 507.65 |
| Desmodur N-100 | 565.13 | 59.36 | 565.13 | 59.36 |
| Subtotal | 5,438.60 | 567.02 | 5438.60 | 567.02 |
| Total | | | | |
| Total | 18,036.05 | 1701.03 | 18036.05 | 1701.03 |

Theoretical Results

| | | | |
|---|---|---|---|
| Weight Solids | 100.00 | Wt/Gal | 10.60 |
| Volume Solids | 100.00 | Mix Ratio (volume) | 2.00:1 |
| P/B | 0.25 | NCO:OH | 1.00 |
| PVC | 6.32 | Theoretical VOC | 0 |

The above component 1 was prepared by addition of the ingredients into a plastic pail liner, under agitation, in the order given, using a Hockmeyer model 2 L, 3 H.P. mixer with a 4 inch diameter high-lift impeller at a 1000 setting. When all the ingredients were added the speed setting was increased to between 3000 and 4000 to disperse the $TiO_2$ pigment. After 30 minutes, the mixture was transferred to another Hockmeyer mixer fitted with a 4 inch Cowels® type mixing blade and equipped with a means of mixing under a vacuum of ~27 mm of Hg where it was mixed an additional 30 minutes at the slowest speed (to minimize splashing). The mixer was stopped and then the vacuum was curtailed. This de-aerates the mixture.

Component 2 is two polymeric isocyanates that were mixed using a high lift impeller. Care is taken to protect the mixture from exposure to moisture.

A suitable extremely smooth surface is chosen on which to apply the gel coat. This could be a commercial mold or for flat test items, 12"×17" photographic Ferrotype plates can be used. A mold release agent is applied to the substrate. Application of the gel coat was done while avoiding entrapping air by the use of a Langeman GL-4 airless spray apparatus using the lowest atomization air pressure possible or a pneumatic applicator such as made by P.C.Cox Limited. A 2:1 by volume mixture of the component 1 to component 2 was used.

Whereas particular embodiments of this invention have been described above for purposes of illustration it will be evident to those skilled in the art that numerous variations of the details of the present invention may be made without departing from the invention as defined in the appended claims.

What is claimed is:

1. A coating composition comprising as component I, a) a polyaspartic acid ester comprising the reaction product of one or more diamines, one or more difunctional acrylate-containing compounds and one or more maleic and/or fumaric acid esters;

b) at least one moisture scavenger;

c) at least one deaerator;

d) at least one plasticizer;

and as component II, one or more polyisocyanates.

2. The composition of claim 1, wherein the polyaspartic acid ester and polyisocyanate are present in a molar ratio of from 1.0 polyaspartic acid ester: 0.8 polyisocyanate to 1.0 polyaspartic acid ester:2.0 polyisocyanate.

3. The composition of claim 1, wherein the polyisocyanate has an average functionality of at least 3 NCO groups.

4. The composition of claim 1, wherein the polyisocyanate is aliphatic.

5. The composition of claim 4, wherein the polyisocyanate is a mixture of an asymmetric trimer of HDI and an HDI-based polymeric isocyanate containing biuret groups.

6. The composition of claim 1, wherein the diamine is isophorone diamine or 4,4-diaminodicyclohexylmethane.

7. The composition of claim 1, wherein the difunctional acrylate-containing compound is 1,6-hexandiol diacrylate.

8. The composition of claim 1, wherein the diamine, acrylate and ester are reacted together in a ratio of from 1 equivalent amine:0.1 moles acrylate: 0.9 moles maleate, to 1 mole amine:0.02 moles acrylate:0.98 moles maleate.

9. The composition of claim 1, wherein the diamine, acrylate and ester are reacted together in a ratio of from 1 equivalent amine:0.1 equivalents acrylate:0.95 equivalents maleate, to 1 equivalent amine:0.04 equivalents acrylate: 0.98 equivalents maleate.

10. The composition of claim 1, wherein the composition comprises between 35-65 wt. % polyaspartic acid ester, 25-35 wt. % polyisocyanate, 0.5-4.0 wt. % plasticizer, 0.25-3.0 wt. % alkoxysilane and 0.25-3.0 wt. % defoamer.

11. A method of making a coating composition comprising the steps of 1) mixing the polyaspartic acid ester with a plasticizer, a deaerator and a moisture-scavenger, to make component I of the composition of claim 1; and 2) mixing the product of step 1 with one or more polyisocyanates as component II, both of steps 1) and 2) carried out under vacuum.

12. A method of coating a substrate, the method comprising the step of mixing and applying components I and II of the coating composition of claim 1 to a substrate using a low-pressure spray apparatus.

13. The method of claim 12, wherein the coating composition is sprayed on the substrate while maintaining a volumetric ratio of from 1:10 to 10:1 for the ratio of component I to component II.

14. The method of claim 13, wherein a 2:1 volumetric ratio of component I to component II is maintained.

15. The method of claim 12, wherein the coating is applied to the substrate in a thickness of 3 to 100 mils.

16. A substrate coated with the composition of claim 1.

17. The substrate of claim 16, wherein the substrate is comprised of metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, polyurethane composites, polyester composites, asphalt, fiberglass, soil, or gravel.

18. A polyaspartic acid ester comprising the reaction product of one or more diamines, one or more difunctional acrylate-containing compounds and one or more maleic and/or fumaric acid esters.

19. The polyaspartic acid ester according to claim 18, wherein the ratio of amine to amine-reactive components is from 0.8/1.0 to 1.2/1.0.

20. The polyaspartic acid ester according to claim 19, wherein the ratio of amine to amine-reactive components is 1.0/1.0.

21. The polyaspartic acid ester according to claim 20, wherein the one or more diamines, one or more difunctional acrylate-containing compounds and one or more maleic and/or fumaric acid esters are reacted together 1 equivalent diamine:0.1 equivalents difunctional acrylate:0.9 equivalents maleic and/or fumaric acid ester, to 1 equivalent diamine:0.02 equivalents difunctional acrylate:0.98 equivalents maleic and/or fumaric acid ester.

22. The polyaspartic acid ester according to claim 18, comprising the reaction product of 4-4'diamino dicyclohexyl methane, 1,6 hexanediol diacrylate and diethyl maleate,

23. The polyaspartic acid ester according to claim 18, consisting of the reaction product of 4-4'diamino dicyclohexyl methane, 1,6 hexanediol diacrylate and diethyl maleate.

* * * * *